United States Patent
Wu et al.

(10) Patent No.: US 10,452,889 B2
(45) Date of Patent: Oct. 22, 2019

(54) APPARATUS AND METHOD FOR DETECTING TOUCH PRESSURE

(71) Applicant: SHENZHEN GOODIX TECHNOLOGY CO., LTD., Shenzhen (CN)

(72) Inventors: Dan Wu, Shenzhen (CN); Gengchun Deng, Shenzhen (CN); Jinchun Ye, Shenzhen (CN); Weiwen Chen, Shenzhen (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/730,661

(22) Filed: Oct. 11, 2017

(65) Prior Publication Data
US 2018/0032783 A1 Feb. 1, 2018

Related U.S. Application Data

(63) Continuation of application No. PCT/CN2015/094641, filed on Nov. 16, 2015.

(30) Foreign Application Priority Data

Aug. 21, 2015 (CN) .......................... 2015 1 0519255

(51) Int. Cl.
*G06K 9/00* (2006.01)
*G06F 3/041* (2006.01)

(52) U.S. Cl.
CPC ........... *G06K 9/0002* (2013.01); *G06F 3/041* (2013.01); *G06F 3/0414* (2013.01); *G06K 9/00* (2013.01); *G06K 9/001* (2013.01); *G06K 9/0008* (2013.01)

(58) Field of Classification Search
CPC ........ G06K 9/0001; G06K 9/00; G06F 3/041; G06F 3/0414
See application file for complete search history.

(56) References Cited

U.S. PATENT DOCUMENTS

| 6,031,942 A | 2/2000 | Nakayama ..................... 382/284 |
| 9,098,188 B2 * | 8/2015 | Kim .................... G06F 3/04812 |

(Continued)

FOREIGN PATENT DOCUMENTS

| CN | 1172308 A | 2/1998 |
| CN | 101855650 A | 10/2010 |

(Continued)

OTHER PUBLICATIONS

International Search Report of corresponding International PCT Application No. PCT/CN2015/094641, dated May 25, 2016.

(Continued)

*Primary Examiner* — Gregory M Desire
(74) *Attorney, Agent, or Firm* — J.C. Patents

(57) ABSTRACT

The present invention discloses an apparatus and a method for detecting a touch pressure. The apparatus includes a fingerprint sensor module and a touch pressure calculating module, where the fingerprint sensor module includes a plurality of pixels, in which: the fingerprint sensor module configured to collect, via the plurality of pixels, texture information data of a body part touching the fingerprint sensor module; the touch pressure calculating module configured to calculate a touch pressure of the body part according to the collected texture information data, thereby achieving the detection of the touch pressure by virtue of an existing fingerprint sensor.

17 Claims, 11 Drawing Sheets

(56) References Cited

U.S. PATENT DOCUMENTS

| | | | |
|---|---|---|---|
| 9,921,668 B1* | 3/2018 | Chadda | G06F 3/041 |
| 2003/0044051 A1 | 3/2003 | Fujieda | 382/124 |
| 2006/0078174 A1 | 4/2006 | Russo | |
| 2009/0267918 A1 | 10/2009 | Lu et al. | 345/175 |
| 2010/0066697 A1 | 3/2010 | Jacomet et al. | 345/173 |
| 2010/0231367 A1* | 9/2010 | Cruz-Hernandez | G06F 3/016 |
| | | | 340/407.2 |
| 2013/0057514 A1 | 3/2013 | Murphy et al. | 345/174 |
| 2013/0285977 A1 | 10/2013 | Baharav et al. | 345/174 |
| 2018/0032783 A1* | 2/2018 | Wu | G06F 3/041 |

FOREIGN PATENT DOCUMENTS

| | | |
|---|---|---|
| CN | 103109252 A | 5/2013 |
| CN | 103745194 A | 4/2014 |
| CN | 104487923 A | 4/2015 |
| CN | 104834380 A | 8/2015 |
| KR | 2015-0007322 | 1/2015 |

OTHER PUBLICATIONS

Nimkar, Rohan et al., "Fingerprint Segmentation Algorithms: A Literature Review" International Journal of Computer Applications, vol. 95, No. 5, (Jun. 2014), pp. 20-24.
The European Summons to attend oral proceedings of corresponding European application No. 15902110.4-1231/3273329, dated Jul. 29, 2019.
The Korean Notice of Allowance of corresponding Republic of Korea application No. 10-2017-7031404, dated Jun. 26, 2019.

* cited by examiner

APPARATUS AND METHOD FOR DETECTING TOUCH PRESSURE

CROSS-REFERENCE TO RELATED APPLICATIONS

This application is a continuation of International Application No. PCT/CN2015/094641, filed on Nov. 16, 2015, which claims priority to Chinese Patent Application No. 201510519255.3, filed on Aug. 21, 2015, both of which are incorporated herein by reference in their entirety.

TECHNICAL FIELD

The present invention relates to the field of pressure detection technologies, and in particular, to an apparatus and a method for detecting a touch pressure.

BACKGROUND

At present, few products on the market can detect touch pressures (such as finger press strength), especially those that are easy to be implemented for detecting touch pressures on a mobile terminal such as a mobile phone. An existing apparatus for detecting the touch pressure mainly applies a piezoresistive detection solution, whose principle is: a piezoresistor sensor is mounted on a bottom of a target detection panel, when the panel is pressed, the panel will endure a tiny stroke under the press strength, thereby rendering a change on the resistance of the piezoresistor sensor mounted on the bottom thereof. As such, the touch pressure is quantified according to the change of the resistance.

The above-mentioned detection solution has following problems:

1. Difficulty in implementation structure: a tiny stroke is required for the sensor to detect the pressure changes, and the sensor needs to be mounted flatly enough below the panel, thereby rendering the method for implementing this structure very difficult.

2. Influence of device arrangement: if the apparatus for detecting the pressure is mounted on the mobile phone, when a relative gravity line of the mobile phone panel changes, a measuring error may occur due to the influence of the gravity on the panel.

3. High cost: sensor cost and structure cost may lead to a high cost of the final solution.

In summary, the existing solution for detecting the touch pressure has the problems such as complex structures and assembling, high costs, low detection sensitivities and large volumes, thereby rendering it difficult to be implemented on the mobile terminal.

SUMMARY

A primary object of the present invention is to provide an apparatus and a method for detecting a touch pressure, so as to solve the problem of complex structures and assembling, high costs, low detection sensitivities, large volumes and uneasy to be implemented on mobile terminals.

To achieve the above objects, the present invention provides an apparatus for detecting a touch pressure, which includes a fingerprint sensor module and a touch pressure calculating module, the fingerprint sensor module includes a plurality of pixels, where:

the fingerprint sensor module is configured to collect, via the plurality of pixels, texture information data of a body part touching the fingerprint sensor module;

the touch pressure calculating module is configured to calculate, according to the collected texture information data, a touch pressure of the body part.

The present invention also provides a method for detecting a touch pressure, the method includes steps of:

collecting, via plurality of pixels, texture information data of a body part touching a fingerprint sensor module;

calculating, according to the collected texture information data, a touch pressure of the body part.

An apparatus for detecting a touch pressure provided by the present invention collects texture information data by using a fingerprint sensor module when a touch operation is performed by a body part, and acquires a touch area, a ridge line deformation degree or an average of the texture information data according to the texture information data, and then quantifies the touch pressure of the body part according to the touch area, the ridge line deformation degree or the average of the texture information data, thereby achieving the detection of the touch pressure by virtue of an existing fingerprint sensor. By using the touch pressure detecting solution of the present invention, no additional physical hardware or structure or assembly design is needed, and no additional cost expense is required basically. Moreover, under the condition that fingerprint recognitions of mobile terminals become more and more popular, the apparatus and the method for detecting the touch pressure in the present invention are facilitated in application and popularization. Compared with a method for detecting a touch pressure in the prior art, the apparatus for detecting the touch pressure of the present invention has a high detecting sensitivity, a simple implementation structure, a lower cost and a small size.

Realizations, functional features and advantages of the present invention will be further described in connection with the embodiments and with reference to the accompanying drawings.

DESCRIPTION OF EMBODIMENTS

It should be understood that the specific embodiments described herein are merely for illustrating the present invention, but are not intended to limit the present invention.

The present invention provides a technical solution for detecting a touch pressure (such as finger press strength) by a fingerprint sensor, the fingerprint sensor described herein includes capacitive, inductive, piezoresistive, ultrasonic and other types of fingerprint sensors. The apparatus and method for detecting the touch pressure of the present invention may be applied to various electronic devices, such as mobile phones, tablets or other mobile terminals.

Figure 1:
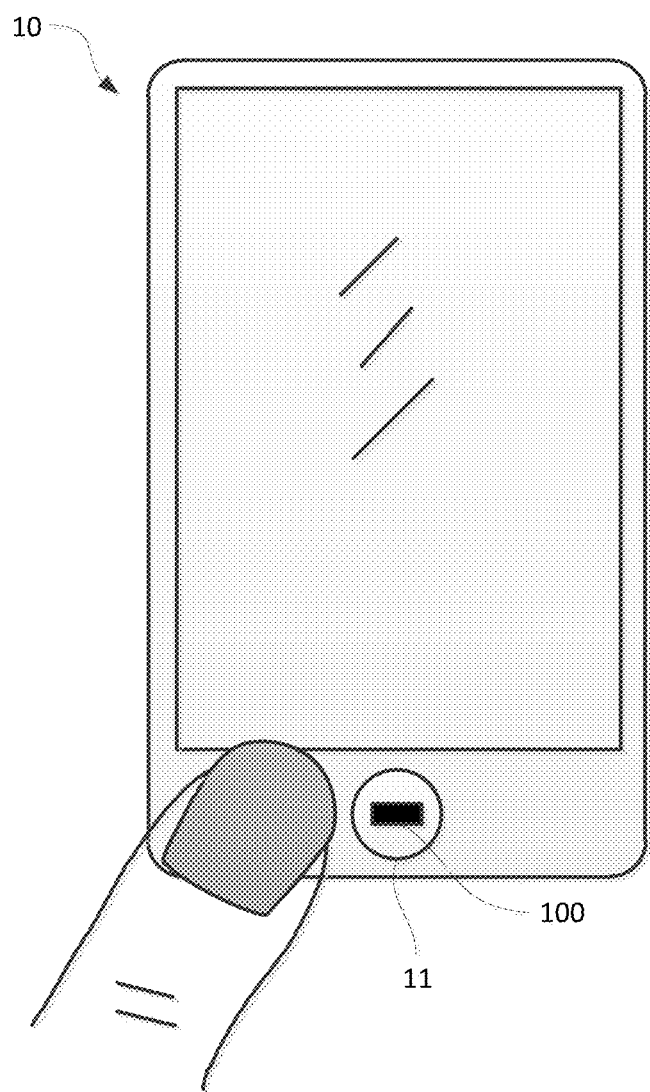
FIG. 1 is a schematic structural diagram of an apparatus for detecting a touch pressure applied on a mobile phone according to an embodiment of the present invention.

As shown in FIG. 1, which is an example of an apparatus 100 for detecting a touch pressure of the present invention applied in a mobile phone; the apparatus 100 for detecting the touch pressure is disposed at the "Home" button 11 of the mobile phone. The apparatus 100 may alternatively be arranged at other locations according to actual requirements.

Figure 2:
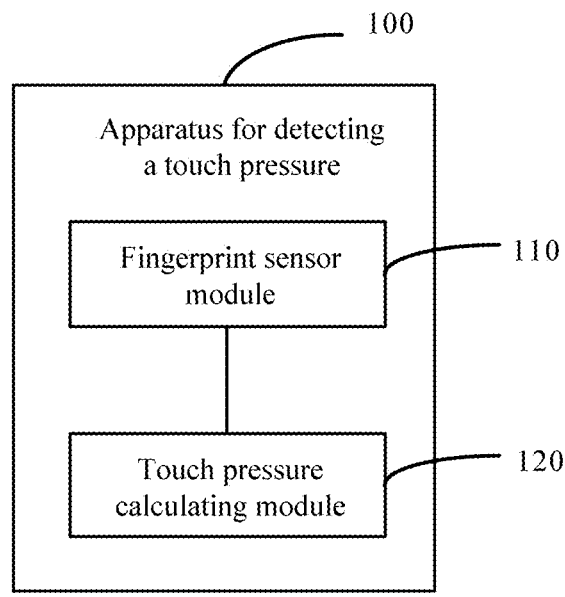
FIG. 2 is a schematic view of modules in an apparatus for detecting a touch pressure according to an embodiment of the present invention.

As shown in FIG. 2, which is a schematic view of modules in an apparatus for detecting a touch pressure according to an embodiment of the present invention, the apparatus 100 for detecting the touch pressure includes a fingerprint sensor module 110 and a touch pressure calculating module 120. The fingerprint sensor module 110 includes multiple pixels, the multiple pixels are used to collect texture information data of a body part touching the fingerprint sensor module 110. The touch pressure calculating module 120 is configured to calculate a touch pressure of the body part according to the collected texture information data. The body part of the present invention generally refers to a finger, while the texture information refers to fingerprint information. The user may use another body part to touch the fingerprint sensor module 110, which is not excluded from the present application.

Figure 3:
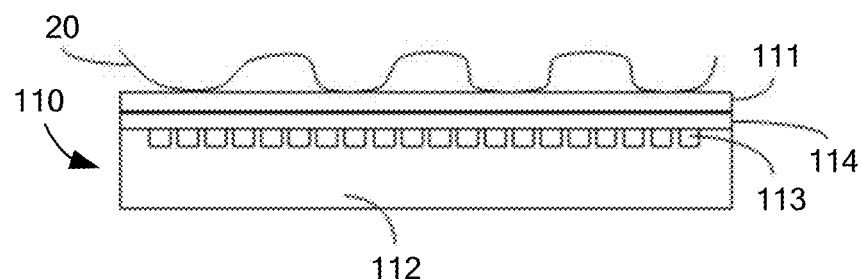
FIG. 3 is a schematic structural diagram of a fingerprint sensor module according to an embodiment of the present invention.
Figure 4:
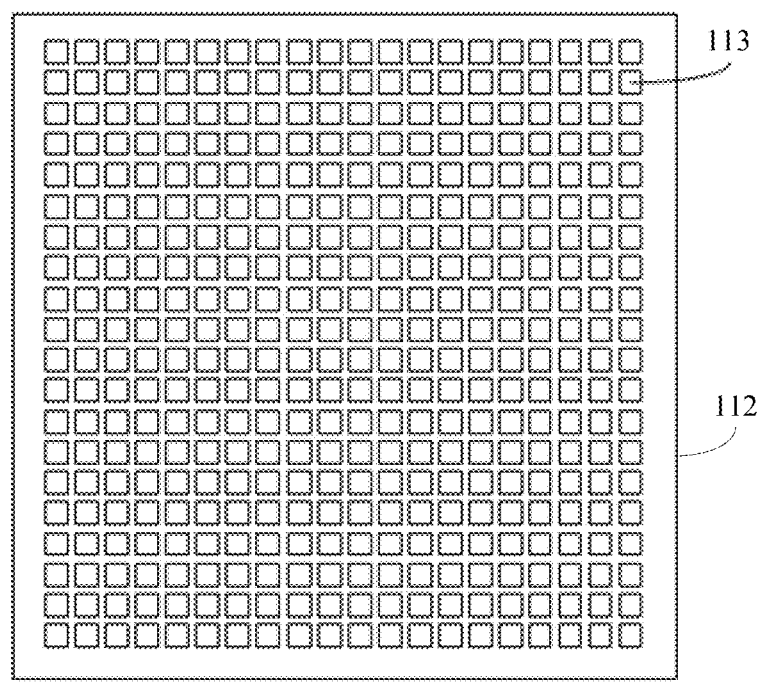
FIG. 4 is a schematic view of pixel distributions according to an embodiment of the present invention.

As shown in FIG. 3, the fingerprint sensor module 110 includes a cover 111, a fingerprint sensor chip 112 and a plurality of pixels 113. The cover 111 is configured to be touched by a body part 20 (such as a finger), which mainly serves to protect the fingerprint sensor 112 and the pixel 113, and maybe not included in the fingerprint sensor module 110 in some embodiments. The cover 111 and the fingerprint sensor chip 112 are fixed together by an adhesive 114; the fingerprint sensor chip 112 has a plurality of pixels 113, which are preferably arranged in a matrix form (as shown in FIG. 4), the pixels 113 are used to sense a depth of the texture of the body part 20 above it. When the body part 20 touches the cover 111 of the fingerprint sensor module 110, a matrix consisting of the depth information of the texture outputted by all pixels 113 is the texture information of the body part 20.

The fingerprint sensor module 110 collects the texture information data is the following manner. The fingerprint sensor module 110 collects a frame of no-load data via multiple pixels 113 without being touched by a body part; the no-load data serves as reference data. When being touched by the body part 20, the fingerprint sensor module 110 collects a frame of sensing data by the multiple pixels 113, calculates a difference between the sensing data and the reference data collected by each pixel 113, and uses the difference as the texture information data of the body part 20.

With different touch pressure of the body part 20, and contact degrees between the body part 20 and the fingerprint sensor module 110 are different, the fingerprint information data collected by the pixel 113 may change accordingly. This mainly represents in: (1) the greater the touch pressure of body part 20 is, the bigger the touch area between the body part 20 and the fingerprint sensor module 110 becomes; (2) as the touch pressure of the body part 20 increases, a texture ridge line (such as a ridge line of the fingerprint) gets close to each other due to an extrusion deformation, the greater the touch pressure is, the more serious the deformation becomes; (3) the greater the touch pressure of the body part 20 is, the more data the pixel 113 outputs. The solution for detecting the touch pressure in the present invention is to detect the touch pressure by taking advantage of the influence caused by the touch pressure of the above body part 20 to the texture information data, the touch pressure detection may be added into the existing fingerprint recognition solution without additional physical hardware or structure or assembly design, and is applicable to apparatuses for identifying fingerprints with different materials, processes and specifications.

Hereinafter, the apparatus for detecting the touch pressure according to the present invention will be described in detail with reference to specific embodiments.

Figure 5:
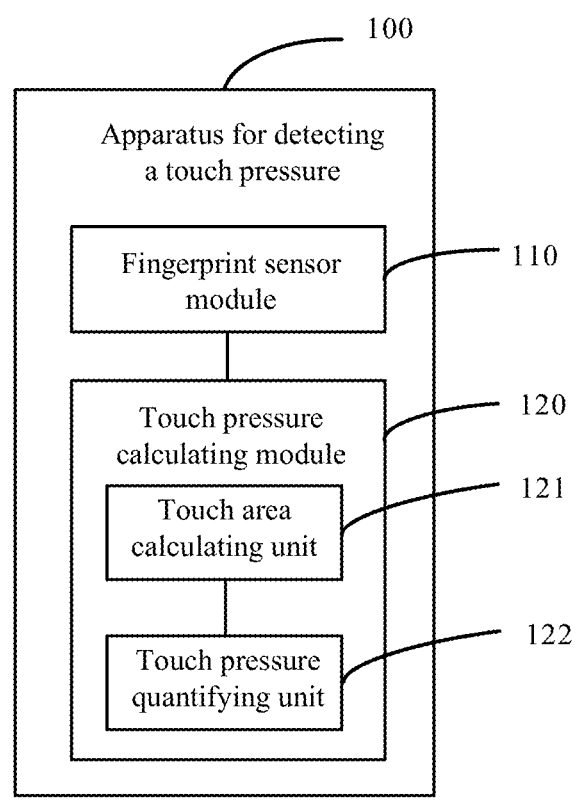
FIG. 5 is a schematic module view of a first embodiment of an apparatus for detecting a touch pressure of the present invention.

With reference to FIG. 5, which provides a first embodiment of an apparatus for detecting a touch pressure of the present invention, the apparatus 100 includes a fingerprint sensor module 110 and a touch pressure calculating module 120.

The fingerprint sensor module 110 includes a plurality of pixels, the plurality of pixels are used to collect texture information data of a body part touching the fingerprint sensor module 110.

Specifically, the fingerprint sensor module 110 collects a frame of no-load data via the plurality of pixels 113 without being touched by the body part 20, and uses the no-load data as reference data. When the body part 20 touches the fingerprint sensor module 110, the fingerprint sensor module 110 collects a frame of sensing data via the plurality of pixels 113, and calculates a difference between the sensing data and the reference data collected by each pixel 113. The difference serves as the texture information data of the body part 20.

The touch pressure calculating module 120 is configured to calculate the touch pressure of the body part 20 according to the collected texture information data.

Figure 6:
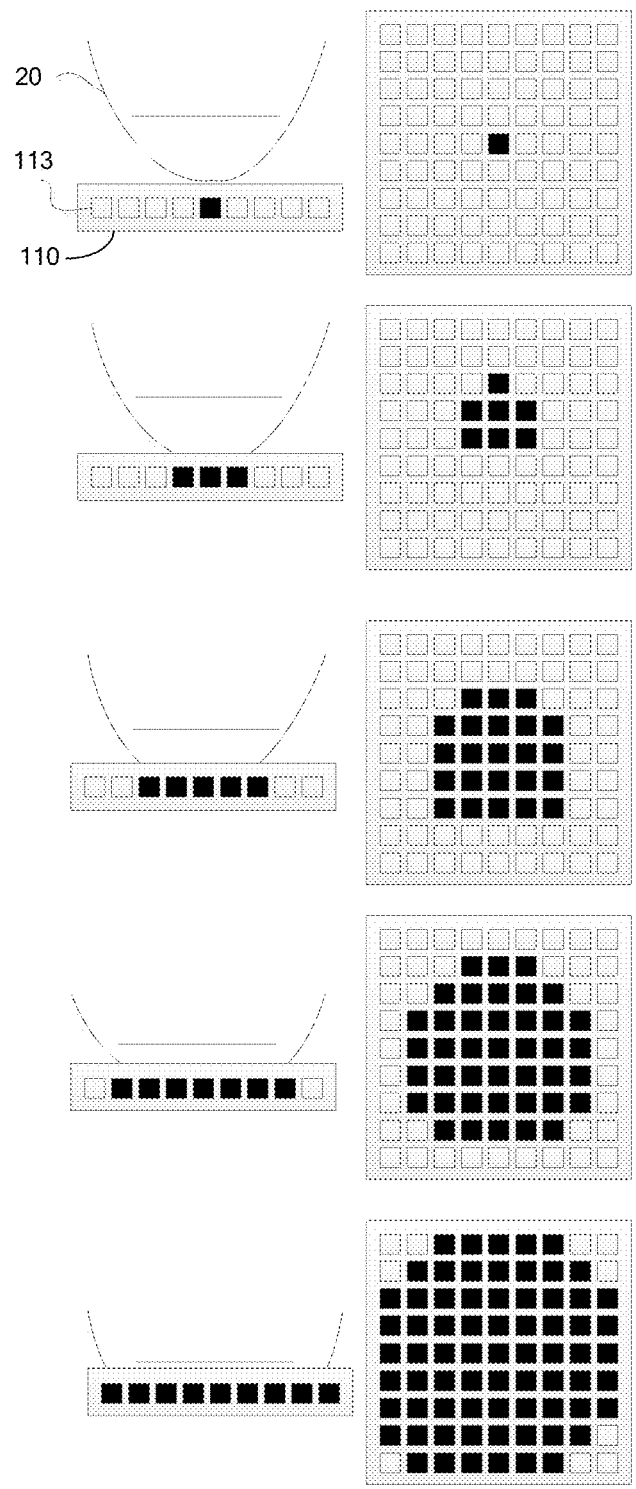
FIG. 6 is a schematic view of a touch area changing with a touch pressure according to an embodiment of the present invention.

When the body part 20 touches the fingerprint sensor module 110, the greater the touch pressure is, the bigger the touch area between the body part 20 and the fingerprint sensor module 110 becomes. As shown in FIG. 6, the touch area between the body part 20 and the fingerprint sensor module 110 increases with the increase of the touch pressure of the body part 20; in FIG. 6, the black pixels 113 indicate that they are touched by the body part 20, and the white pixels 113 indicate that they are not touched by the body part 20.

In view of this, the touch pressure calculating module 120 according to the embodiment of the present invention quantifies the touch pressure according to the area of the fingerprint sensor module 110 touched by the body part 20. Specifically, as shown in FIG. 5, the touch pressure calculating module 120 includes:

a touch area calculating unit 121, configured to calculate a touch area of the fingerprint sensor module 110 which is touched by the body part 20 according to the collected texture information data.

Preferably, the touch area calculating unit 121 counts the number of pixels 113 of which the collected texture information data is greater than a threshold, and measuring the touch area by using the number of the counted the pixels 113.

For example, the touch area calculating unit 121 compares the texture information data collected by each pixel 113 with a threshold, and judges whether the texture information data is greater than the threshold value. When the texture information data is greater than the threshold value, the touch area calculating unit 121 determines that the pixel 113 is touched by the body part 20, and counts the number of the pixels 113 being touched by the body part 20. Assuming that the area of each pixel 113 is 1 and the number of the touched pixels 113 is n, then the touch area S=1*n=n.

The touch pressure calculating module 120 further includes a touch pressure quantifying unit 122, configured to quantify the touch pressure of the body part 20 according to the touch area. The touch area is positively correlated with the touch pressure, that is, the larger the touch area is, the greater the touch pressure becomes; the smaller the touch area is, the smaller the touch pressure becomes.

Preferably, the touch pressure quantifying unit 122 quantifies the touch pressure according to the following equation:

$$F = \frac{S}{S_0} * N$$

F represents the touch pressure, S represents the touch area of the fingerprint sensor module 110 touched by the body part 20, $S_0$ represents the total area of the fingerprint sensor module 110 (that is, the area of all pixels 113), and N represents a quantification level of the touch pressure.

The solution for detecting the touch pressure of the present embodiment requires that the fingerprint sensor module 110 is capable of covering a complete texture area of the body part 20, when the total area of the fingerprint sensor module 110 is larger, the detection effect is better.

For instance, assuming that the body part 20 is a finger, the pixels 113 are arranged in a matrix, the apparatus 100 for detecting the touch pressure according to the embodiment of the present invention detects the touch pressure as follows.

(1) When there is no finger touch, for example, when the device starts, a frame of data is collected, and an output value of a pixel 113 is used as a reference for judging whether this pixel 113 has experienced a finger touch. The reference value for the pixel 113 in the i-th row and the j-th column is represented as $b_{i,j}$, and a touch judging threshold is set to be Thre.

(2) For each pixel 113, it is judged whether being touched by a finger or not, and the judgment criteria is as follows:

$$t_{i,j} = \begin{cases} 1, & x_{i,j} - b_{i,j} > Thre \\ 0, & x_{i,j} - b_{i,j} \leq Thre \end{cases}$$

$x_{i,j}$ is sensing data of outputted by the pixel 113 in the i-th row and the j-th column, the difference between the $x_{i,j}$ and the $b_{i,j}$ is the texture information data collected by the pixel 113; $t_{i,j}=1$ indicates that the pixel 113 has experienced a finger touch, which the $t_{i,j}=0$ indicates that the pixel 113 has experienced no finger touch.

(3) The area touched by the finger is calculated, that is, the number of the pixels 113 which have experienced the finger touch is counted as Num($t_{i,j}=1$).

(4) The touch pressure is quantified according to the area of the finger touch, which is defined as follows:

$$ForceDegree = \frac{Num(t_{i,j} = 1)}{W * H} * N$$

H and W are the number of rows and the number of columns of the matrix of the pixels 113, and the N is the quantification level of the finger pressure.

Figure 7:
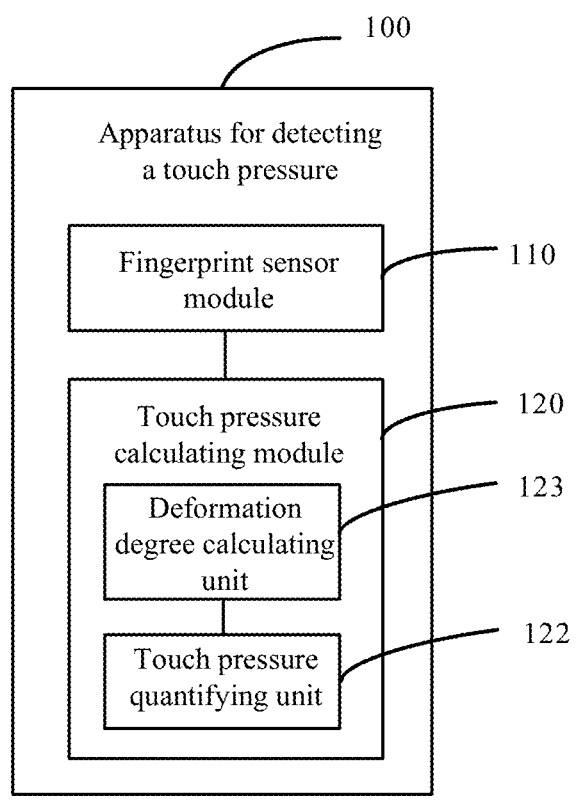
FIG. 7 is a schematic module view of a second embodiment of an apparatus for detecting a touch pressure of the present invention.

With reference to FIG. 7, a second embodiment of an apparatus for detecting a touch pressure of the present invention is provided; the apparatus 100 includes a fingerprint sensor module 110 and a touch pressure calculating module 120.

The fingerprint sensor module 110 includes a plurality of pixels 113, and the plurality of pixels 113 are used to collect texture information data of a body part touching the fingerprint sensor module 110.

Specifically, the fingerprint sensor module 110 collects a frame of no-load data via multiple pixels 113 without being touched by the body part 20, and the no-load data serves as reference data. When the body part 20 touches the fingerprint sensor module 110, the fingerprint sensor module 110 collects a frame of sensing data via the multiple pixels 113, calculates a difference value between the sensing data and the reference data collected by each pixel 113, and the difference value serves as the texture information data of the body part 20.

The touch pressure calculating module 122 is configured to calculate the touch pressure of the body part 20 according to the collected texture information data.

The value of the texture information data collected by the pixel 113 can reflect the depth of the texture. When the body part 20 touches the fingerprint sensor module 110, the pixel 113 corresponding to a ridge of the texture may collect a maximum data value because the ridge of the texture (e.g., a convex part of the fingerprint) is closest to the fingerprint sensor module 110; whereas a valley of the texture (e.g., a concave part of the fingerprint) is farther from the fingerprint sensor module 110, and the pixel 113 corresponding to the valley of the texture may collect a less data value.

Figure 8:
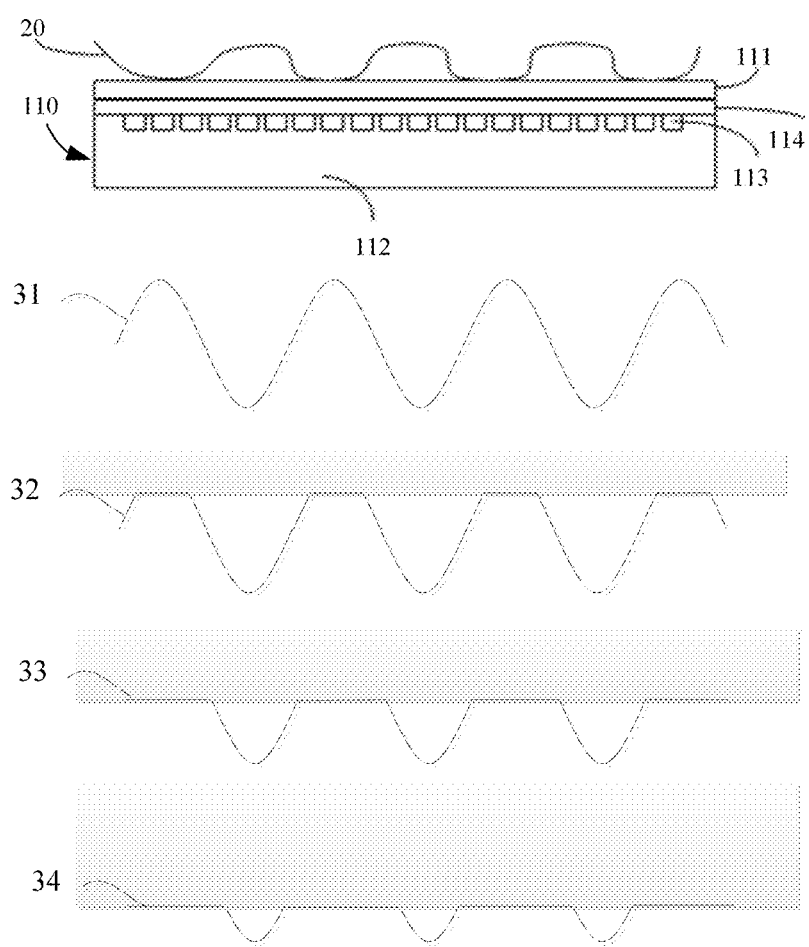
FIG. 8 is a schematic view of texture direction data changing with a touch pressure according to an embodiment of the present invention.

When the touch pressure of the body part 20 is light, the ridge lines of the texture are completely in contact with the fingerprint sensor module 110, whereas the valley lines are completely not in contact with the fingerprint sensor module 110; the change curve of the texture information data will be a sine-like curve in an alternating direction of the valley line and the ridge line (hereinafter referred to as "texture direction"), as shown in FIG. 8 (simplified here as an ideal sinusoidal curve for the convenience of illustration). When the touch pressure of the body part 20 increases, the ridge lines are subjected to compression deformations and become close to each other, and a texture portion that is completely in contact with the fingerprint sensor module 110 increases, the number of the pixels 113 that output the maximum values increases, and a crest of the change curve in the texture direction suffers deformation and becomes a plane. The greater the touch pressure is, the more obvious the deformation becomes; with the touch pressure increases, the change curve of the texture information data of the body part 20 in the texture direction is shown by 31-34 in FIG. 8.

Based on the above description, the touch pressure calculating module 120 according to the embodiment of the present invention quantifies the touch pressure of the body part 20 according to a ridge line deformation degree. Specifically, as shown in FIG. 7, the touch pressure calculating module 120 includes:

a deformation degree calculating unit 123, configured to calculate the ridge line deformation degree of the texture of the body part 20 according to the collected texture information data. The deformation degree calculating unit 123 may calculate the ridge line deformation degree by calculating a variance of the texture information data, a ratio of a ridge line width to a valley line width of the texture, a gradient amount in the texture direction, performing a curve fitting in the texture direction, or the like; the deformation degree calculating unit 123 may alternatively calculate the ridge line deformation degree by synthetically considering evaluation parameters of at least two methods described in the above-described methods.

For example, the deformation degree calculating unit 123 calculates a variance of the collected texture information data, and measures the ridge line deformation degree by using the variance. The variance is negatively correlated with the ridge line deformation degree; that is, the greater the variance is, the less the ridge line deformation degree becomes; the less the variance is, the greater the ridge line deformation degree becomes.

As another example, the deformation degree calculating unit 123 calculates a ratio of a ridge line width to a valley line width in the texture information data collected currently according to the collected texture information data, and measures the ridge line deformation degree by using the ratio of the ridge line width to the valley line width. The ratio of the ridge line width to the valley line width is positively correlated with the ridge line deformation degree; that is, the greater the ratio of the ridge line width to the valley line width is, the greater the ridge line deformation degree becomes; the less the ratio of the ridge line width to the valley line width is, the less the ridge line deformation degree becomes. Preferably, a proportion of ridge lines in the texture information data collected currently may be calculated according to the collected texture information data, and measures the ratio of the ridge line width to the valley line width by using the proportion of the ridge lines.

The touch pressure quantifying unit 122, configured to quantify the touch pressure of the body part 20 according to the ridge line deformation degree. The ridge line deformation degree is positively correlated with the touch pressure, that is, the greater the ridge line deformation degree becomes, the greater the touch pressure is; the less the ridge line deformation degree becomes, the smaller the touch pressure is.

For example, the ridge line deformation degree is measured by using the variance of the collected texture information data, and the quantification formula for the touch pressure is:

$$F = \frac{\sigma^2}{\Delta_1}$$

F represents the touch pressure, $\sigma^2$ represents the variance, $\Delta_1$ represents a pressure level interval, which may be adjusted according to the number of pressure levels to be qualified.

As another example, the ridge line deformation degree is measured by using the ratio of the ridge line width to the valley line width of the collected texture information data, and the quantification formula for the touch pressure is:

$$F = \left(\frac{Num}{M} - \frac{1}{2}\right) * 2 * N$$

F represents the touch pressure, Num represents the number of the pixels which have collected ridge line data, M represents the total number of the pixels, $$\frac{Num}{M}$$

represents the proportion of the ridge lines, N represents the quantification level of the touch pressure.

Comparing with the first embodiment, the apparatus 100 for detecting the touch pressure of the present embodiment is suitable for different sizes of fingerprint sensor modules 110.

For instance, assuming that the body part 20 is a finger, the pixels 113 are arranged in a matrix, the apparatus 100 for detecting the touch pressure according to the embodiment of the present invention detects the touch pressure as follows:

(1) When there is no finger touch, for example, when the device starts, a frame of data is collected, and the collected frame of data is used as a reference for no finger touch; the reference value of the pixel in the i-th row and the j-th column, is $b_{i,j}$.

(2) A frame of data is collected when a finger touches the fingerprint sensor module 110, and the collected data is subtracted from the reference to obtain a difference value; the difference value is used as the collected fingerprint information data. The difference value between the reference and the data outputted by the pixel in the i-th row and the j-th column is $D_{i,j}$, where $D_{i,j} = x_{i,j} - b_{i,j}$; $x_{i,j}$ is the sensing data outputted by the pixel in the i-th row and the j-th column.

(3) The ridge line deformation degree of the fingerprint is calculated, and the touch pressure is quantified. The ridge deformation of the fingerprint may be determined by calculating a variance of the fingerprint information data, a ratio of a ridge line width to a valley line width of the fingerprint, a gradient amount in the fingerprint line direction, performing a curve fitting in the fingerprint line direction, or the like; or, by synthetically considering several evaluation parameters.

For example, a mathematical model defining the ridge line deformation degree of the fingerprint by virtue of the variance is provides as follows:

$$\overline{D} = \frac{1}{W * H} \sum_{i=1}^{H} \sum_{j=1}^{W} D_{i,j}$$

$$\sigma^2 = \frac{1}{K} \sum_{k=1}^{K} (D_k - \overline{D})^2$$

H and W are the number of rows and columns of the matrix of the pixels, $\overline{D}$ is an average of the currently collected fingerprint information data, K is the number of the pixels of which the collected fingerprint information is greater than $\overline{D}$, and $D_k$ is the fingerprint information data value collected by the K-th pixel greater than $\overline{D}$. The greater the finger pressure is, the greater the squeezing degree the finger skin is experienced, the more smooth the ridge line of fingerprint becomes, and the less the value of variance $\sigma^2$ is.

At this time, the touch pressure may be quantified as follows:

$$ForceDegree = \frac{\sigma^2}{\Delta_1}$$

$\Delta_1$ is the pressure level interval, which may be adjusted according to the number of pressure levels to be qualified.

As another example, a method for determining the ridge line deformation degree of fingerprint is described as follows by virtue of the ratio of the ridge line width to the valley line width of the fingerprint.

First, whether the pixel 113 corresponds to a valley line or a ridge line of the fingerprint is judged according to the fingerprint information data collected by each pixel 113. The judgment criteria is as follows:

$$c_{i,j} = \begin{cases} 1, D_{i,j} > \overline{D} \\ 0, D_{i,j} \leq \overline{D} \end{cases}$$

$C_{i,j}=1$ represents the pixel 113 corresponds to the ridge line of the fingerprint, and $C_{i,j}=0$ represents the pixel 113 corresponds to the valley line of the fingerprint.

Then, the ratio of the ridge line width to the valley line width of the fingerprint is calculated. To simplify the calculation, the ratio is represented as the proportion of ridge lines in the frame of data herein. When the pressure is lighter, the ridge lines of the fingerprint are completely in contact with the fingerprint sensor module 110, while the valley lines are completely not in contact with the fingerprint sensor module 110, the ratio is about ½; when the pressure is very great, the ridge lines may be connected together, and the ratio approaches to 1. Therefore, the finger touch pressure may be quantified as follows:

$$ForceDegree = \left(\frac{Num(C_{i,j} = 1)}{W * H} - \frac{1}{2}\right) * 2 * N$$

H and W are the number of rows and columns of the matrix of the pixels, $Num(C_{i,j}=1)$ is the number of the pixels 113 corresponding to the ridge lines of the fingerprint, and N is the quantification level of the finger pressure.

Figure 9:
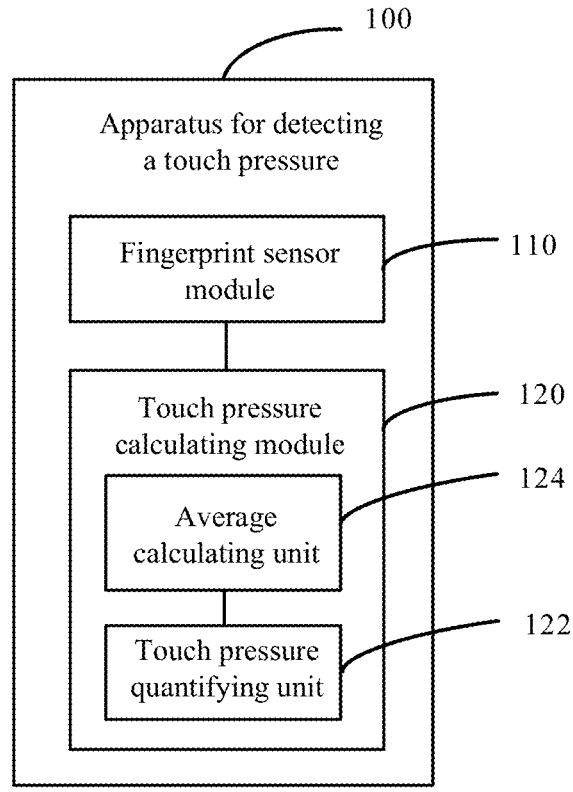
FIG. 9 is a schematic module view of a third embodiment of an apparatus for detecting a touch pressure of the present invention.

With reference to FIG. 9, which provides a third embodiment of an apparatus for detecting a touch pressure of the present invention, the apparatus 100 includes a fingerprint sensor module 110 and a touch pressure calculating module 120.

The fingerprint sensor module 110 includes a plurality of pixel 113; the plurality of pixels 113 are used to collect texture information data of a body part touching the fingerprint sensor module 110.

Specifically, the fingerprint sensor module 110 collects a frame of no-load data via multiple pixels 113 without being touched by the body part 20, the no-load data serves as reference data. When the body part 20 touches the fingerprint sensor module 110, the fingerprint sensor module 110 collects a frame of sensing data via the multiple pixels 113, calculates a difference between the sensing data and the reference data collected by each pixel 113, and using the difference as the texture information data of the body part.

The touch pressure calculating module 122 is configured to calculate the touch pressure of the body part 20 according to the collected texture information data.

Figure 10:
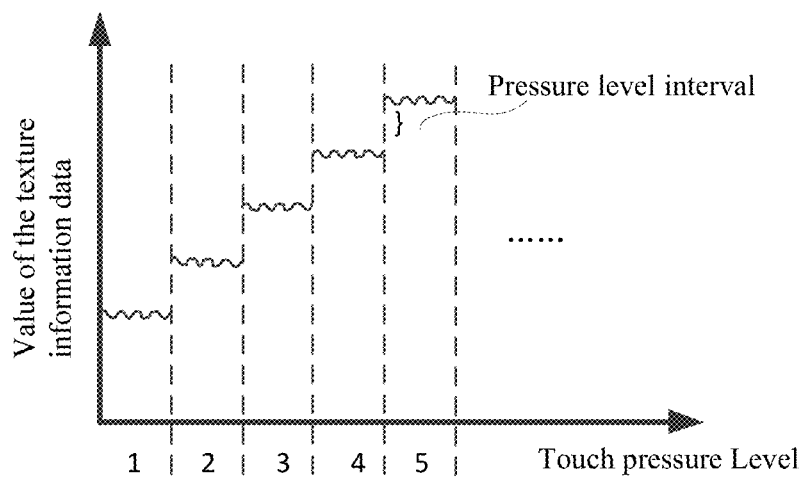
FIG. 10 is a schematic view of the texture direction data with the function of the touch pressure level according to an embodiment of the present invention.

When the touch pressure is smaller, the distance between the body part 20 and the fingerprint sensor module 110 is greater, and the fingerprint information data collected by each pixel 113 is less. When the touch pressure increases, the skin of the body part 20 is squeezed, and the contact between the body part 20 and the fingerprint sensor module 110 becomes more tightly, the distance between the body part 20 and the fingerprint sensor module 110 decreases, the fingerprint information data collected by each pixel 113 increases, and the value of the fingerprint information data collected by the pixel 113 is positively correlated with the touch pressure. As shown in FIG. 10, which illustrates a value variation of the fingerprint information data collected by the fingerprint sensor module 110 under different touch pressures.

Based on the above description, the touch pressure calculating module 120 according to the embodiment of the present invention quantifies the touch pressure according to the currently collected texture information data. Specifically, as shown in FIG. 9, the touch pressure calculating module 120 includes:

an average calculating unit 124, configured to calculate an average of the currently collected texture information data;

a touch pressure quantifying unit 122, configured to quantify the touch pressure of the body part 20 according to the average of the texture information data; the average of the texture information data is positively correlated with the touch pressure, that is, the greater the average is, the greater the touch pressure is; the less the average is, the smaller the touch pressure is.

For example, the touch pressure quantifying unit 122 quantifies the touch pressure according to the following equation:

$$F = \frac{\overline{D}}{\Delta_2}$$

F represents the touch pressure, $\overline{D}$ represents the average of the currently collected fingerprint information data, $\Delta_2$ represents the pressure level interval, which may be adjusted according to the number of pressure levels to be qualified (as shown in FIG. 10).

Comparing with the above two embodiments, the apparatus 100 for detecting the touch pressure in the present embodiment is suitable for different sizes of fingerprint sensor modules 110, and has a larger data variation range and a higher detection accuracy.

For instance, assuming that the body part 20 is a finger, the pixels 113 are arranged in a matrix, the apparatus for detecting the touch pressure 100 of the embodiment of the present invention detects the touch pressure as follows.

(1) When there is no finger touch, for example, when the device starts, a frame of data is collected, and the collected frame of data is used as a reference for no finger touch; the reference value of the pixel in the i-th row and the j-th column, is $b_{i,j}$.

(2) A frame of data is collected when a finger touches the fingerprint sensor module 110, and the collected data is subtracted from the reference to obtain a difference value; the difference value is used as the collected fingerprint information data. The difference value between the reference and the data outputted by the pixel in the i-th row and the j-th column is $D_{i,j}$, where $D_{i,j}=x_{i,j}-b_{i,j}$; $x_{i,j}$ is the sensing data outputted by the pixel in the i-th row and the j-th column.

(3) The touch pressure is quantified according to the following equation:

$$ForceDegree = \frac{\frac{1}{W*H}\sum_{i=1}^{H}\sum_{j=1}^{W}D_{i,j}}{\Delta_2}$$

H and W are the number of rows and columns of the matrix of the pixels 113, $\Delta_2$ represents the pressure level interval, which may be adjusted according to the number of pressure levels to be qualified.

The apparatus 100 for detecting the touch pressure according to the present invention collects the texture information data by using the fingerprint sensor module 110 when the touch operation is performed by the body part 20, obtains the touch area, the ridge line deformation degree or the average of the texture information data according to texture information data, and then quantifies the touch pressure of the body part according to the touch area, the ridge line deformation degree or the average of the texture information data, thereby achieving the detection of the touch pressure by virtue of an existing fingerprint sensor. By using the touch pressure detecting solution of the present invention, no additional physical hardware or structure or assembly design is needed, and no additional cost expense is required basically. Moreover, under the condition that fingerprint recognitions of mobile terminals become more and more popular, the apparatus and the method for detecting the touch pressure in the present invention are facilitated in application and popularization. Compared with a method for detecting a touch pressure in the prior art, the apparatus for detecting the touch pressure of the present invention has a high detecting sensitivity, a simple implementation structure, a lower cost and a small size.

When the apparatus for detecting the touch pressure according to the present invention is applied to an electronic device such as a mobile terminal, the fingerprint sensor can ensure safety while detecting the touch pressure (such as the finger pressure), thus operation functions of the devices can be enriched according to the pressure, thereby rendering interactive modes more convenient. For example, when a user is listening to a music or viewing a map with a smartphone, the volume may be turned up or down by virtue of the finger pressure, so does the zooming in or out of the image.

The present invention also provides a method for detecting a touch pressure, a main concept of this method is: collecting, via a plurality of pixels, texture information data of a body part touching a fingerprint sensor module; calculating a touch pressure of the body part according to the collected texture information data. The touch pressure of the body part may be quantified according to a touch area of the body part touching the fingerprint sensor module, a ridge line deformation degree of the texture of the body part or an average of the collected texture information data.

Hereinafter, detailed descriptions will be made with reference to specific examples.

Figure 11:
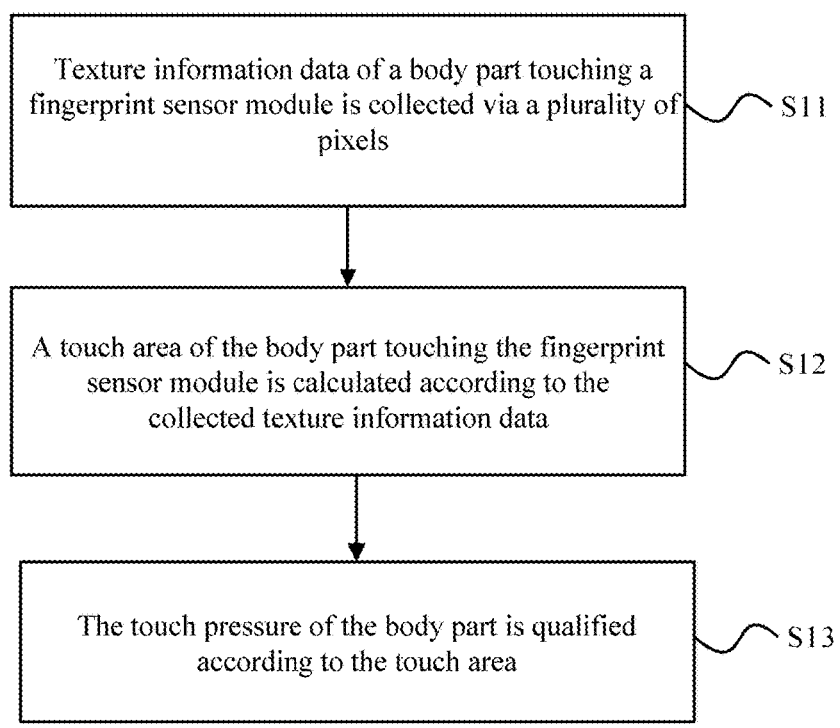
FIG. 11 is a schematic view of a method for detecting a touch pressure according to a first embodiment of the present invention.

With reference to FIG. 11, it provides a first embodiment of a method for detecting a touch pressure of the present invention, and includes the steps of:

S11, texture information data of a body part touching a fingerprint sensor module is collected via a plurality of pixels.

Specifically, a frame of no-load data is collected via the plurality of pixels without being touched by a body part, and the no-load data serves as reference data; when the body part touches the fingerprint sensor module, a frame of sensing data is collected via the plurality of pixels; a difference value between the sensing data and the reference data collected by each pixel is calculated, and the difference value serves as the texture information data of the body part.

S12, a touch area of the body part touching the fingerprint sensor module is calculated according to the collected texture information data.

Preferably, the number of pixels of which the collected texture information data is greater than a threshold is counted, and the touch area is measured by using the number of the counted pixels.

For example, the texture information data collected by each pixel is compared with a threshold, it is judged whether the texture information data is greater than the threshold value, when it is greater than the threshold value, it is determined that the pixel is touched by the body part and the number of the pixels being touched by the body part is counted. Assuming that the area of each pixel is 1 and the number of the touched pixels is n, then the touch area $S=1*n=n$.

S13, the touch pressure of the body part is qualified according to the touch area.

The touch area is positively correlated with the touch pressure, that is, the larger the touch area is, the greater the touch pressure becomes; the smaller the touch area is, the smaller the touch pressure becomes.

Preferably, the touch pressure may be quantified according to the following equation:

$$F = \frac{S}{S_0}*N$$

F represents the touch pressure, S represents the touch area of the fingerprint sensor module touched by the body part, $S_0$ represents the total area of the fingerprint sensor module (that is, the area of all pixels), and N represents a quantification level of the touch pressure.

The solution for detecting the touch pressure of the present embodiment requires that the sensor module is capable of covering a complete texture area of the body part, when the total area of the sensor module is larger, the detection effect is better.

Figure 12:
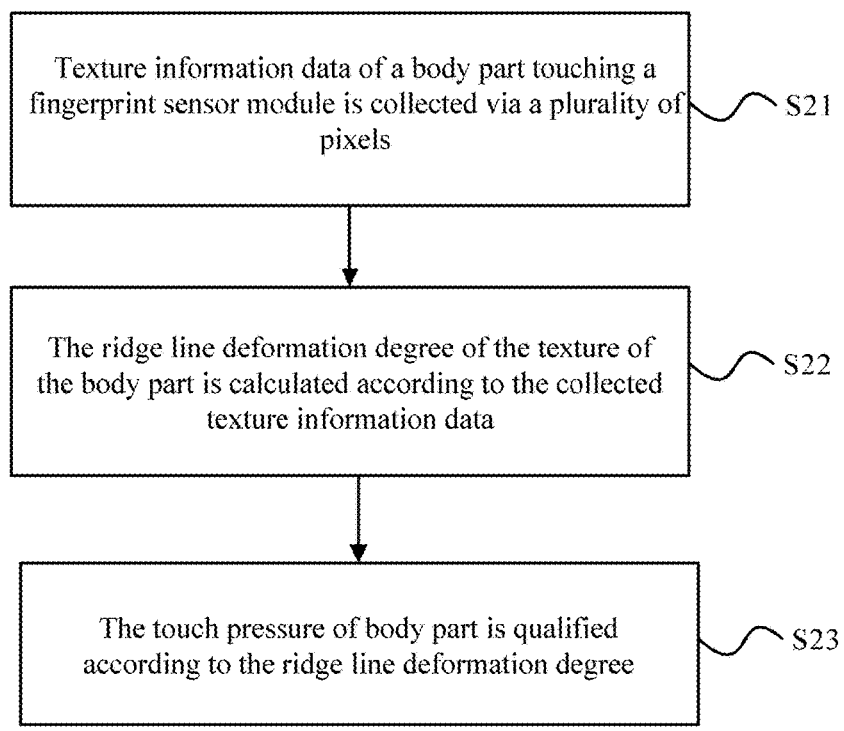
FIG. 12 is a schematic view of a method for detecting a touch pressure according to a second embodiment of the present invention.

With reference to FIG. 12, it is a second embodiment of a method for detecting a touch pressure of the present invention is provided, and includes the steps of:

S21, texture information data of a body part touching a fingerprint sensor module is collected via a plurality of pixels.

Specifically, a frame of no-load data is collected via the plurality of pixels without being touched by a body part, and the no-load data serves as reference data; when the body part touches the fingerprint sensor module, a frame of sensing data is collected via the plurality of pixels; a difference value between the sensing data and the reference data collected by each pixel is calculated, and the difference serves as the texture information data of the body part.

S22, the ridge line deformation degree of the texture of the body part is calculated according to the collected texture information data.

Specifically, the ridge line deformation degree may be calculated by calculating a variance of the texture information data, a ratio of a ridge line width to a valley line width of the texture, a gradient amount in the texture direction, performing a curve fitting in the texture direction or the like, or the ridge line deformation degree may be calculated by synthetically considering evaluation parameters of at least two methods described in the above-described methods.

For example, the deformation degree calculating unit calculates a variance of the collected texture information data, and measures the ridge line deformation degree by using the variance. The variance is negatively correlated with the ridge line deformation degree, that is, the greater the variance is, the less the ridge line deformation degree becomes; the less the variance is, the greater the ridge line deformation degree becomes.

As another example, the deformation degree calculating unit calculates a ratio of a ridge line width to a valley line width in the texture information data collected currently according to the collected texture information data, and measures the ridge line deformation degree by using the ratio of the ridge line width to the valley line width. The ratio of the ridge line width to the valley line width is positively correlated with the ridge line deformation degree, that is, the greater the ratio of the ridge line width to the valley line width is, the greater the ridge line deformation degree becomes; the less the ratio of the ridge line width to the valley line width is, the less the ridge line deformation degree becomes. Preferably, a proportion of ridge lines in the texture information data collected currently may be calculated according to the collected texture information data, and measures the ratio of the ridge line width to the valley line width by using the proportion of the ridge lines.

S23, the touch pressure of body part is qualified according to the ridge line deformation degree.

For example, the ridge line deformation degree is measured by using the variance of the collected texture information data, and the quantification formula for the touch pressure is:

$$F = \frac{\sigma^2}{\Delta_1}$$

F represents the touch pressure, $\sigma^2$ represents the variance, $\Delta_1$ represents a pressure level interval, which may be adjusted according to the number of pressure levels to be qualified.

As another example, the ridge line deformation degree is measured by using the ratio of the ridge line width to the valley line width of the collected texture information data, and the quantification formula for the touch pressure is:

$$F = \left(\frac{Num}{M} - \frac{1}{2}\right) * 2 * N$$

F represents the touch pressure, Num represents the number of the pixels which have collected ridge line data, M represents the total number of the pixels, $$\frac{Num}{M}$$

represents the proportion of the ridge lines, N represents the quantification level of the touch pressure.

Comparing with the first embodiment, the method for detecting the touch pressure of the present embodiment is suitable for different sizes of fingerprint sensor modules 110.

Figure 13:
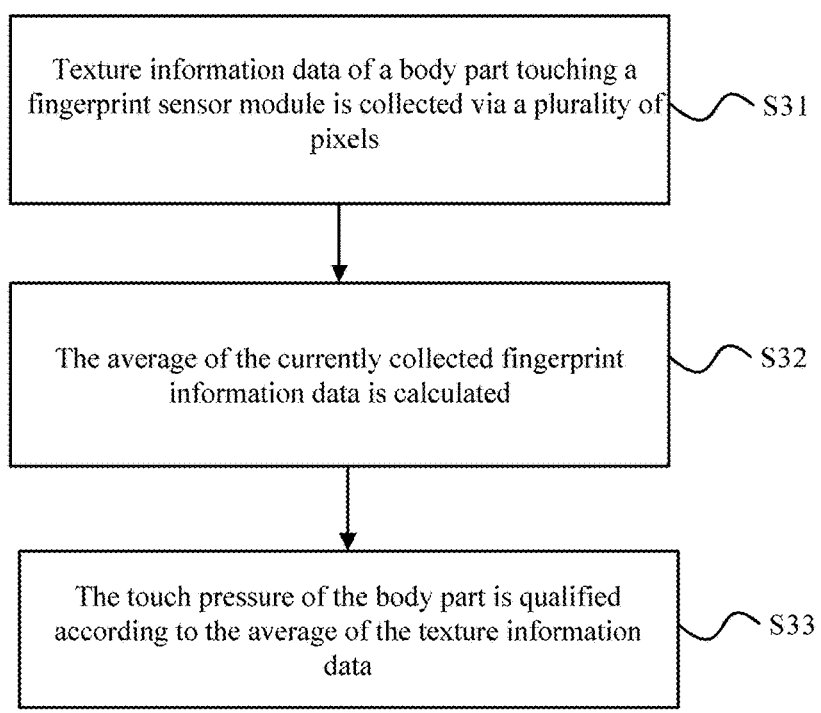
FIG. 13 is a schematic view of a method for detecting a touch pressure according to a third embodiment of the present invention.

With reference to FIG. 13, it provides a third embodiment of a method for detecting a touch pressure of the present invention, and includes the steps of:

S31, texture information data of a body part touching a fingerprint sensor module is collected via a plurality of pixels.

Specifically, a frame of no-load data is collected via the plurality of pixels without being touched by a body part, and the no-load data servers as reference data; when the body part touches the fingerprint sensor module, a frame of sensing data is collected via the plurality of pixels; a difference value between the sensing data and the reference data collected by each pixel is calculated, and the difference serves as the texture information data of the body part.

S32, the average of the currently collected fingerprint information data is calculated.

The average of the texture information data is calculated as:

$$\overline{D} = \frac{1}{W*H}\sum_{i=1}^{H}\sum_{j=1}^{W} D_{i,j}$$

S33, the touch pressure of the body part is qualified according to the average of the texture information data.

For example, the touch pressure quantifying unit quantifies the touch pressure according to the following equation:

$$F = \frac{\overline{D}}{\Delta_2}$$

F represents the touch pressure, $\overline{D}$ represents the average of the currently collected fingerprint information data, $\Delta_2$ represents the pressure level interval, which may be adjusted according to the number of pressure levels to be qualified.

The method for detecting the touch pressure according to the present invention collects the texture information data by using the fingerprint sensor module when the touch operation is performed by the body part, obtains the touch area, the ridge line deformation degree or the average of the texture information data according to texture information data, and then quantifies the touch pressure of the body part according to the touch area, the ridge line deformation degree or the average of the texture information data, thereby achieving the detection of the touch pressure by virtue of an existing fingerprint sensor. By using the touch pressure detecting solution of the present invention, no additional physical hardware or structure or assembly design is needed, and no additional cost expense is required basically. Moreover, under the condition that fingerprint recognitions of mobile terminals become more and more popular, the apparatus and the method for detecting the touch pressure in the present invention are facilitated in application and popularization. Compared with a method for detecting a touch pressure in the prior art, the apparatus for detecting the touch pressure of the present invention has a high detecting sensitivity, a simple implementation structure, a lower cost and a small size.

It should be noted that the method for detecting the touch pressure provided by the above embodiments and embodiments of the apparatus for detecting the touch pressure belong to the same concept, and the technical features in the apparatus embodiments are also applicable in the method embodiments, which will not be repeated herein again.

Those of ordinary skill in the art may understand that all or part of the steps in the above method embodiments may be implemented by a program instructing relevant hardware, the program may be stored in a computer-readable storage medium, which may be a ROM, a RAM, a magnetic disk, an optical disk, or the like.

The preferred embodiments of the present invention have been described above with reference to the accompanying drawings, but are not intended to limit the claim scope of the present invention. It will be apparent to those skilled in the art that various modifications maybe made without departing from the scope and the essence of the present invention, for example, the features of one embodiment may be used in another embodiment to obtain a further embodiment. Various additions, modifications and substitutions that may be made within the technical concept of the present inventions hall all fall within the scope of the claimed invention.

What is claimed is:

1. An apparatus for detecting a touch pressure, comprising: a fingerprint sensor, a processor and a non-transitory computer readable storage medium, wherein the fingerprint sensor comprises a plurality of pixels, and the non-transitory computer readable storage medium comprises computer program codes which when executed by the processor cause the processor to execute steps comprising:
   collecting, via the plurality of pixels, texture information data of a body part touching the fingerprint sensor; and
   calculating, according to the collected texture information data, a touch pressure of the body part;
   wherein the fingerprint sensor is configured to:
   collect a frame of no-load data via the plurality of pixels without being touched by a body part, and using the no-load data as reference data;
   when the body part touches the fingerprint sensor, collect a frame of sensing data via the plurality of pixels; and
   calculate a difference value between the sensing data and the reference data collected by each pixel, wherein the difference value serves as the texture information data of the body part.

2. The apparatus for detecting the touch pressure according to claim 1, wherein the processor is further caused to execute the followings:
   calculating, according to the collected texture information data, a touch area of the body part touching the fingerprint sensor;
   quantifying, according to the touch area, the touch pressure of the body part, wherein the touch area is positively correlated with the touch pressure.

3. The apparatus for detecting the touch pressure according to claim 2, wherein the processor is further caused to execute the following:
   counting the number of pixels of which the collected texture information data is greater than a threshold, and measuring the touch area by using the number of the counted pixels.

4. The apparatus for detecting the touch pressure according to claim 1, wherein the processor is further caused to execute the followings:
   calculating, according to the collected texture information data, a ridge line deformation degree of a texture of the body part;
   quantifying, according to the ridge line deformation degree, the touch pressure of the body part, wherein the ridge line deformation degree is positively correlated with the touch pressure.

5. The apparatus for detecting the touch pressure according to claim 4, wherein the processor is further caused to execute the following:
   calculating a variance of the collected texture information data, and measure the ridge line deformation degree by using the variance, wherein the variance is negatively correlated with the ridge line deformation degree.

6. The apparatus for detecting the touch pressure according to claim 4, wherein the processor is further caused to execute the following:
   calculating, according to the collected texture information data, a ratio of a ridge line width to a valley line width in the currently collected texture information data, and measuring the ridge line deformation degree by using the ratio of the ridge line width to the valley line width, wherein the ratio of the ridge line width to the valley line width is positively correlated with the ridge line deformation degree.

7. The apparatus for detecting the touch pressure according to claim 6, wherein the processor is further caused to execute the followings:
   calculating, according to the collected texture information data, a proportion of ridge lines in the currently collected texture information data, and measuring the ratio of the ridge line width to the valley line width by using the proportion of the ridge lines;
   quantifying the touch pressure according to a formula $$F = \left(\frac{Num}{M} - \frac{1}{2}\right) * 2 * N;$$

wherein F represents the touch pressure, Num represents the number of the pixels which have collected ridge line data, M represents the total number of the pixels, N represents a quantification level of the touch pressure.

8. The apparatus for detecting the touch pressure according to claim 1, wherein the processor is further caused to execute the followings:
   calculating an average of the currently collected texture information data;
   quantifying, according to the average of the texture information data, the touch pressure of the body part, wherein the average of the texture information data is positively correlated with the touch pressure.

9. A method for detecting a touch pressure, comprising steps of:
   collecting, via a plurality of pixels, texture information data of a body part touching a fingerprint sensor; and
   calculating, according to the collected texture information data, a touch pressure of the body part;

wherein the collecting, via the plurality of pixels, texture information data of a body part touching a fingerprint sensor comprises:
collecting a frame of no-load data via the plurality of pixels without being touched by a body part, wherein the no-load data serves as reference data;
when the body part touches the fingerprint sensor, collecting a frame of sensing data via the plurality of pixels; and
calculating a difference value between the sensing data and the reference data collected by each pixel, wherein the difference value serves as the texture information data of the body part.

10. The method for detecting the touch pressure according to claim 9, wherein the calculating, according to the collected texture information data, a touch pressure of the body part comprises:
calculating, according to the collected texture information data, a touch area of the body part touching the fingerprint sensor;
quantifying, according to the touch area, the touch pressure of the body part, wherein the touch area is positively correlated with the touch pressure.

11. The method for detecting the touch pressure according to claim 10, wherein the calculating a touch area of the body part touching the fingerprint sensor-comprises:
counting the number of pixels of which the collected texture information data is greater than a threshold, and measuring the touch area by using the number of the counted pixels.

12. The method for detecting the touch pressure according to claim 9, wherein the calculating, according to the collected texture information data, a touch pressure of the body part comprises:
calculating, according to the collected texture information data, a ridge line deformation degree of a texture of the body part;
quantifying, according to the ridge line deformation degree, the touch pressure of the body part, wherein the ridge line deformation degree is positively correlated with the touch pressure.

13. The method for detecting the touch pressure according to claim 12, wherein the calculating a ridge line deformation degree of a texture of the body part comprises:
calculating a variance of the collected texture information data, and measuring the ridge line deformation degree by using the variance, wherein the variance is negatively correlated with the ridge line deformation degree.

14. The method for detecting the touch pressure according to claim 12, wherein the calculating a ridge line deformation degree of a texture of the body part comprises:
calculating, according to the collected texture information data, a ratio of a ridge line width to a valley line width in the currently collected texture information data, and measuring the ridge line deformation degree by using the ratio of the ridge line width to the valley line width,
wherein the ratio of the ridge line width to the valley line width is positively correlated with the ridge line deformation degree.

15. The method for detecting the touch pressure according to claim 14, wherein the calculating, according to the collected texture information data, a ratio of a ridge line width to a valley line width in the currently collected texture information data comprises:
calculating, according to the collected texture information data, a proportion of ridge lines in the currently collected texture information data, and measuring the ratio of the ridge line width to the valley line width by using the proportion of the ridge lines;
wherein the quantifying, according to the ridge line deformation degree, the touch pressure of the body part comprises:
quantifying the touch pressure according to a formula $$F = \left(\frac{Num}{M} - \frac{1}{2}\right) * 2 * N;$$

wherein F represents the touch pressure, Num represents the number of the pixels which have collected ridge line data, M represents the total number of the pixels, N represents a quantification level of the touch pressure.

16. The method for detecting the touch pressure according to claim 9, wherein the calculating, according to the collected texture information data, a touch pressure of the body part comprises:
calculating, according to the collected texture information data, an average of the currently collected texture information data;
quantifying, according to the average, the touch pressure of the body part, wherein the average is positively correlated with the touch pressure respectively.

17. An apparatus, comprising a processor configured to implement a method comprising:
obtaining texture information data from a fingerprint sensor, the texture information data corresponding to a body part touching a fingerprint sensor; and
determining a touch pressure of the body part applied on the fingerprint sensor according to the collected texture information data;
wherein the touch pressure is determined by:
calculating the number of pixels of which the collected texture information data being greater than a threshold in the fingerprint sensor, and quantifying the touch pressure based on the number of pixels; or,
calculating a ridge line deformation degree of a texture of the body part according to the collected texture information data, and quantifying the touch pressure based on the ridge line deformation degree; or,
calculating an average of the collected texture information data, and quantifying the touch pressure of the body part based on the average of the texture information data.

* * * * *